May 23, 1944. E. P. OLSON 2,349,455
APPARATUS FOR INTERNALLY COATING CONTAINERS
Filed March 18, 1943 9 Sheets-Sheet 5

Fig. 9.

Patented May 23, 1944

2,349,455

UNITED STATES PATENT OFFICE 2,349,455

APPARATUS FOR INTERNALLY COATING CONTAINERS

Eric P. Olson, New York, N. Y., assignor to The Diamond Match Company, New York, N. Y., a corporation of Delaware Application March 18, 1943, Serial No. 479,583

15 Claims. (Cl. 91—37)

This invention relates to an apparatus for applying a hard-drying adhesive, such as glue, to the inner pervious surfaces of containers in order to render them impermeable to the contents of the containers, having reference, more particularly, to the coating of tubular paper boxes, or shells, for extensible coils of paper carrying a permanently sticky adhesive, such as is used on fly catcher ribbons.

The principal object of my invention is the provision of efficient mechanism of novel construction for rapidly applying to the internal surface of a box, or shell, particularly at and adjacent the bottom, a coating of "paint" which affords, when dry, an indurated lining that precludes the absorption by the permeable paper wall of the structure of the penetrant content that gravitates to the bottom of the box, thus obviating the heretofore unsightly discoloration of the outer surface of the box when it is stored for an extended period, which box usually bears printed descriptive matter or other advertising indicia. Other objects of the invention will hereinafter appear.

In the form of embodiment of the invention herein illustrated the mechanism is associated with a typical machine for finishing the bottoms of tubular paper boxes, which mechanism is so constructed and arranged in cooperative relation to the machine as to receive the boxes as they are ejected from the machine, thence presenting them to instrumentalities for internally painting each succeeding box at the bottom thereof with a superficial protective coating, then conveying them to a point of discharge.

The invention also comprises novel features of construction and combinations of parts, all of which will be hereinafter particularly described, and the scope of the invention be expressed in the appended claims.

Figure 1:
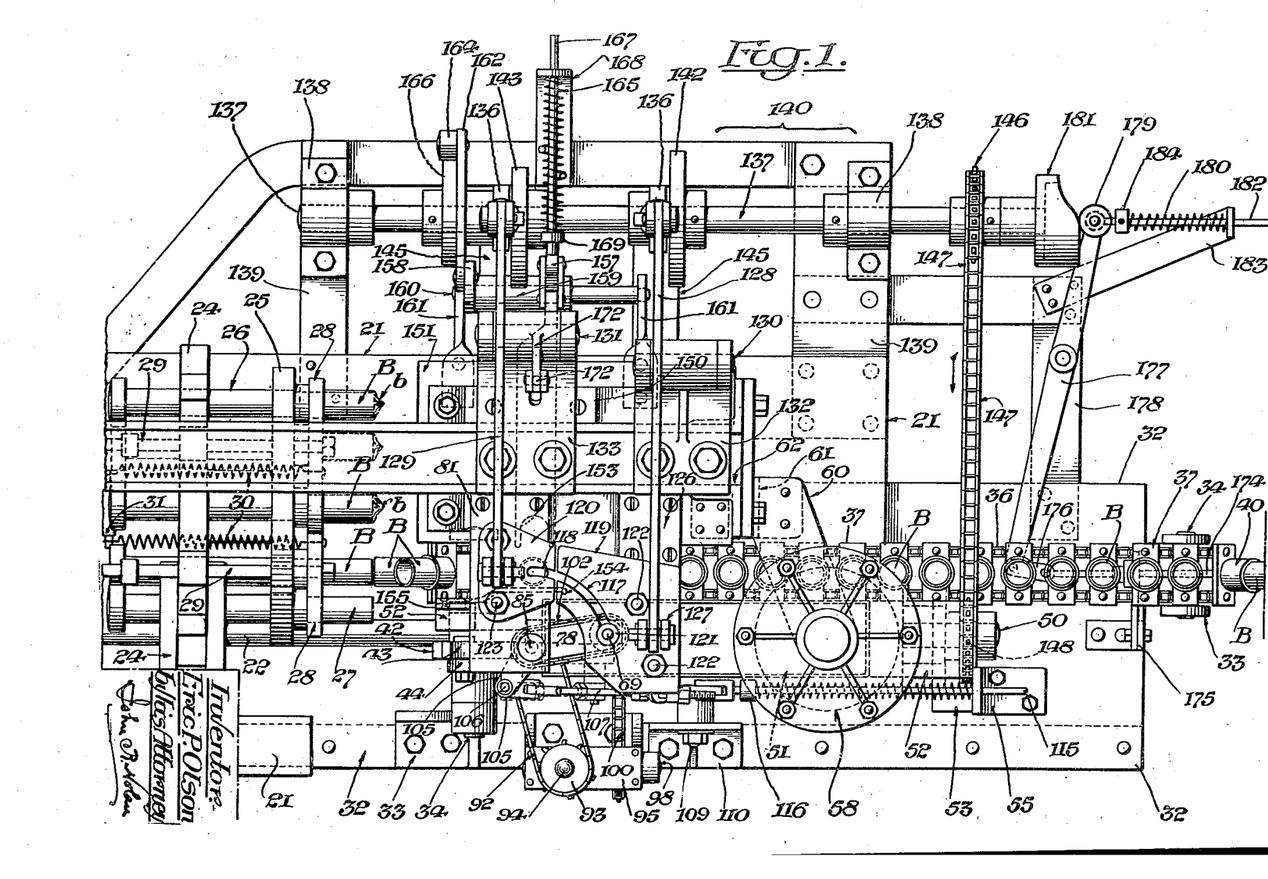
Figure 1 is a plan of an apparatus embodying my invention as associated with a machine for finishing the bottoms of tubular paper boxes, only so much of the machine being shown as is necessary to illustrate the invention.
Figure 2:
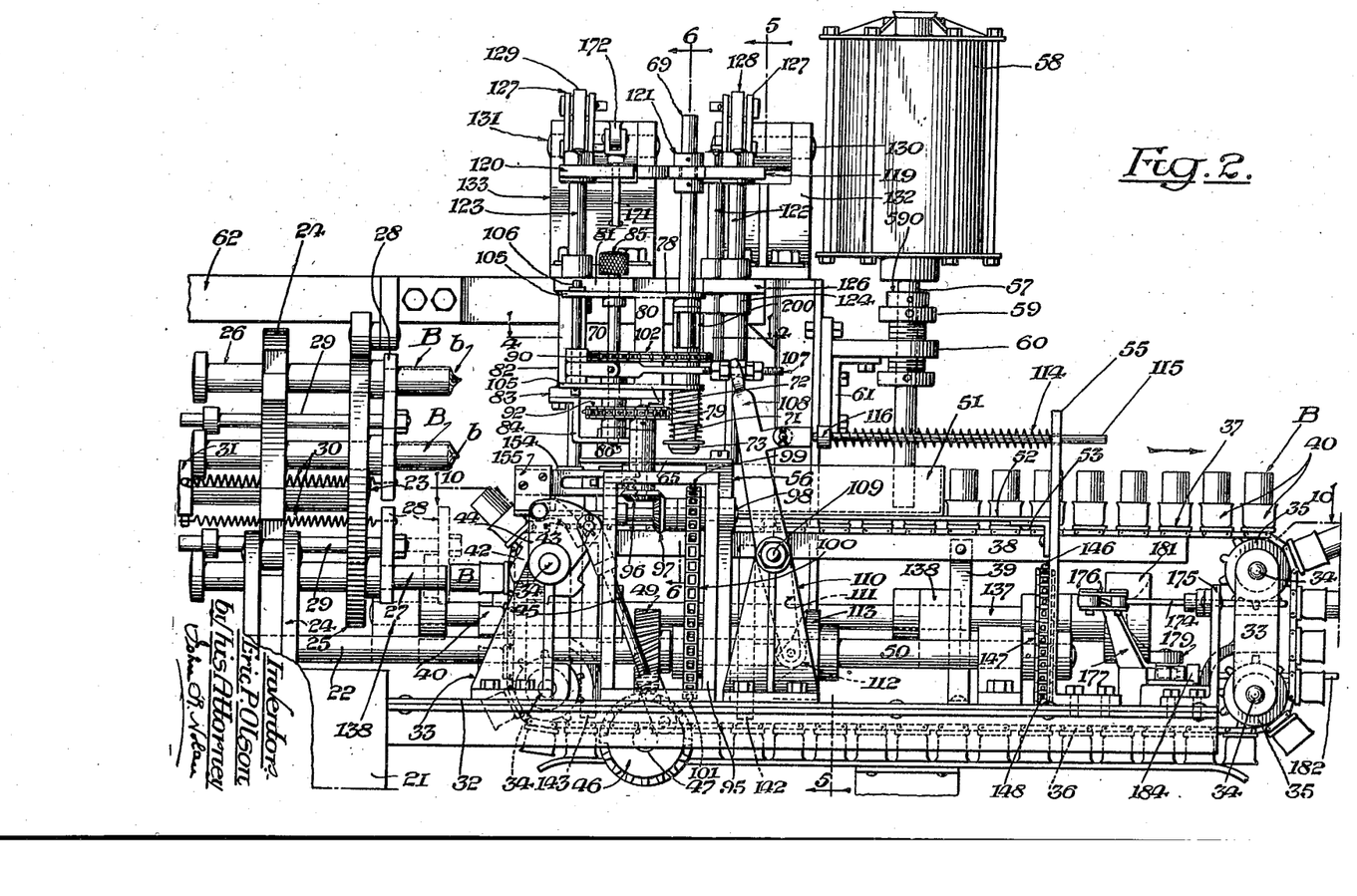
Fig. 2 is a side elevation of the apparatus shown in Fig. 1.
Figure 3:
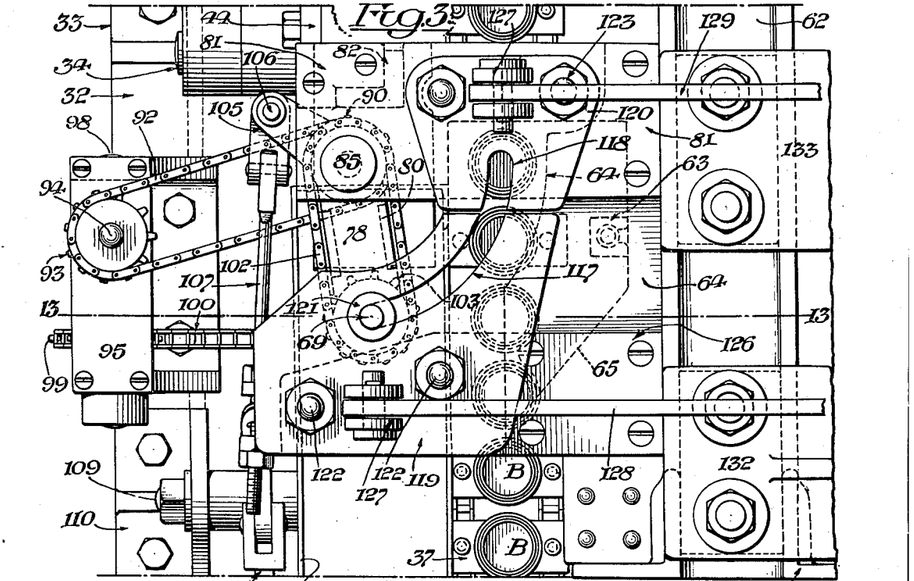
Fig. 3 is a partial plan of a portion of the apparatus in the region of the devices for independently oscillating and reciprocating the brush spindle.
Figure 4:
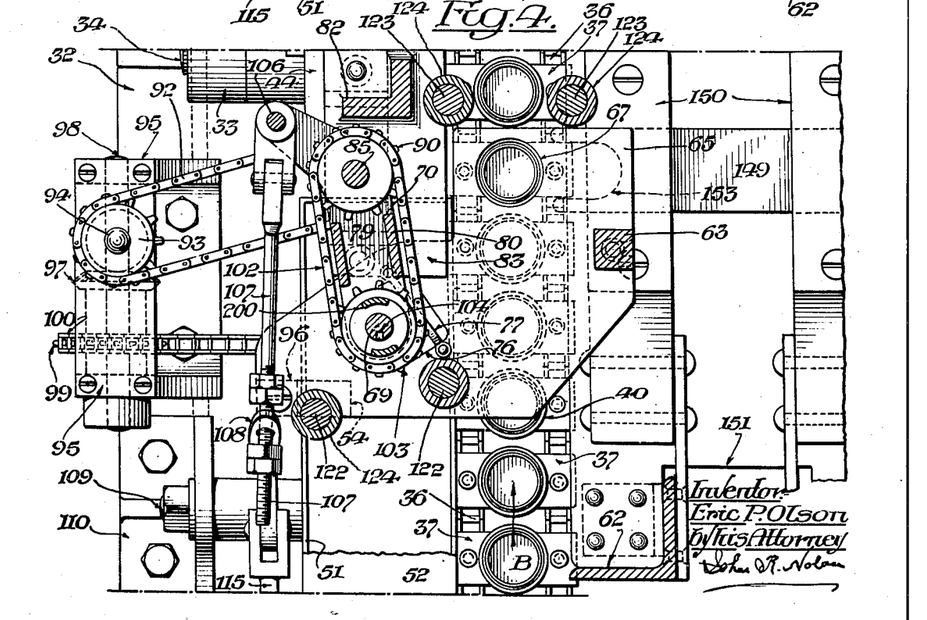
Fig. 4 is a transverse horizontal section in a plane through the oscillating carriage for the brush spindle, as on the line 4—4 of Fig. 2.

Referring to Figs. 1 and 2 of the drawings, 21 designates a portion of the supporting frame of a machine of known construction for completing the partially formed bottoms of tubular paper boxes by compressing the bottom laps of the boxes. 22 designates the main shaft of the machine, which shaft is journaled in bearings supported by the frame; 23 designates a shaft parallel with and above the main shaft, and 24 designates a Geneva gear connection between the two shafts for imparting uniform intermittent motion to the shaft 23. Fast on and movable with the driven shaft 23 is a box supporting head comprising a disk 25 having a circular series of equally spaced transverse orifices in which are slidably fitted for independent reciprocation a corresponding number of parallel plunger rods 26 whereof the free ends 27 are reduced in diameter and project beyond the face of the disk. These reduced ends constitute male die members each of which is adapted to receive and support at a convenient part of its circular path a tubular box B having a partially formed bottom b abutting the end of the die member. (See Figs. 1, 2 and 5.)

The die portions of the rods 26 also project freely through a corresponding series of radial plates 28 located on the face of the intermittently rotatable disk 25, which plates abut the shoulders at the bases of the respective die portions 27. The plates 28 are secured to parallel pusher rods 29 which slidably extend through transverse orifices in the disk and are normally retracted by suitably disposed springs 30 secured to the respective plates 28 and also to a collar 31 fast on the shaft 23 carrying the disk. Thus the plates 28 are normally retracted against the face of the disk, and at the same time, such plates by their contact with the shoulders of the plunger rods, resiliently hold the latter rods in their retracted position with the die ends of the plunger rods projecting beyond the respective plates as well as beyond the face of the disk.

When in a dwell of the intermittently moving disk 25 any of the plunger rods 26 carrying on its die portion a tubular box having a partially formed bottom, is forced downward, the shoulder of the plunger rod bears against and advances the associated plate against the force of the spring 30 on the plate 28, and when in a succeeding dwell of the disk the pusher rod is independently forced forward its associated plate is moved along the die portion of the plunger rod in opposition to the retractive action of the spring.

A partially formed tubular box is applied to the projecting die member of each succeeding plunger rod at the loading level, and is then advanced to a level in which the projecting die member of the plunger rod and the box are in axial alignment with a stationary complementary die member (not shown), whereupon such plunger rod together with its companion plate 28 is forced against the spring action and is then released. In the forward stroke of the male die member and the box thereon, the bottom of the box is driven into the opposing complementary die member, in consequence of which the bottom laps of paper are compactly pressed together and in and around the adjacent inner end of the box body, as usual. The spring 30 upon the release of the plunger rod retracts such rod and the finished box thereon, together with the proximate plate 28 toward the face of the disk. Thereafter each succeeding box carried by the intermittently moving head is advanced to a level where the box is removed endwise from the male die member 27 by actuation of the plate 28 which is associated with that member, as indicated by the dotted lines at the lower right hand side of the disk, as viewed in Fig. 2. This plate thus constitutes a stripper.

Mechanism embodying my invention for internally painting the tubular boxes at and adjacent the bottoms thereof, is illustrated in the drawings as arranged in cooperative relation to the bottom finishing machine in order to receive each succeeding box as it is discharged from the die member of a plunger rod, which mechanism in an efficient form is of the following description.

Figure 9:
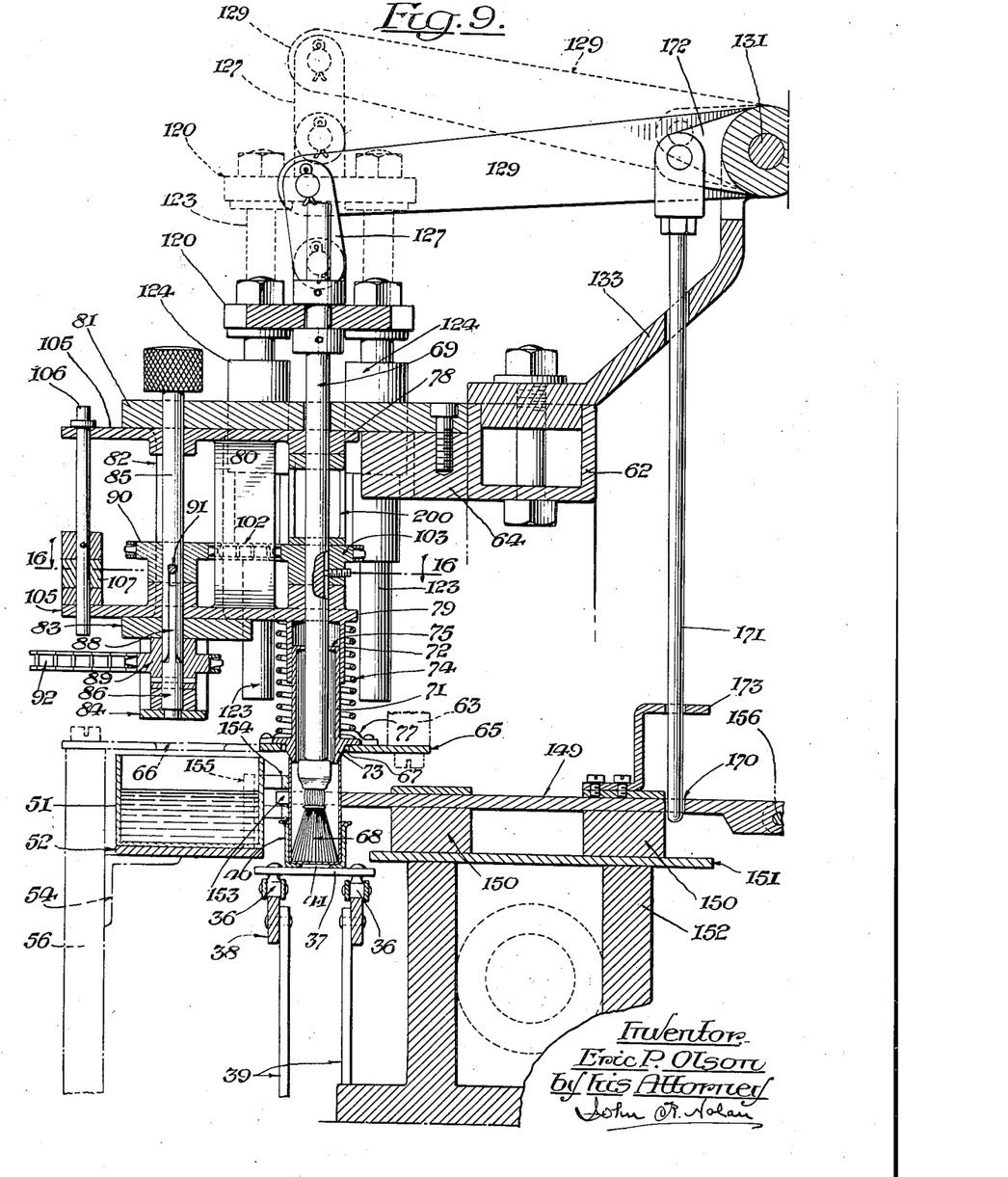
Fig. 9 is a similar section, but showing the carriage swung over the conveyer, and the brush as lowered into an underlying box borne by the conveyer.

32 designates a table which is conveniently located at and longitudinally of the front of the bottom finishing machine, one end of the table being in proximity to the face of the intermittently movable disk 25. Brackets 33 supported at the respective ends of the table afford bearings for the upper and lower shafts 34 of sprocket wheels 35 about which are trained the spaced parallel chains 36 of an endless conveyer, which chains are connected by perforated spacers 37. The wheels 35 are mounted and arranged to direct the upper and lower longitudinal runs of the conveyer above and under the table, respectively, and to provide vertical stretches at the respective ends of the table. One of the vertical stretches travels in spaced relation to the path of each succeeding die member 27 at the discharging level of the bottom finishing machine. Two parallel bars 38 supported by posts 39 rising from the table guide the upper runs of the conveyer chains during their longitudinal travel. The conveyer, which is equipped at spaced intervals throughout its length with outwardly projecting holders 40 secured to the chain spacers 37, is intermittently moved step-by-step to position the holders in succession in axial alignment with the respective boxes as they are consecutively discharged from the die plunger of the box supporting head. Each of the holders 40 as shown consists of a metal cup-like member having a perforation 41 in registry with the perforation of the adjacent spacer 37 and adapted to support in upright position a contained open-top tubular box when it is progressing with the upper run of the conveyer. (See Figs. 6 and 9.)

Any suitable means for actuating the conveyer may be employed. In the present instance the shaft 34 of the upper sprocket wheel 35 at the receiving end of the conveyer has fast thereon a ratchet wheel 42 with the teeth of which engages a pawl 43 pivotally mounted on a rocker 44 loose on the shaft 34. The rocker is pivotally connected by means of a depending rod 45 with one face of an angle gear 46 loose on a stud shaft 47 below the table, the pivotal point of connection to the gear being eccentrically of the gear. This stud shaft is supported by a depending bracket 48 (Fig. 5) which is bolted to the table. The gear 46 is in mesh with a similar gear 49 fast on an extension 50 of the main shaft 22 of the machine, and the ratio of the gearing is such that the ratchet devices are actuated to move the conveyer in timed relation to the intermittently rotating head of the machine.

A tank 51, or other vessel, adapted to contain a supply of hard drying adhesive, as, for example, a suitable glue for internally coating the tubular boxes and imparting an impermeable lining thereto, is arranged laterally of the receiving end of the chain conveyer, the tank being conveniently supported by a shelf 52 which, in turn, is supported by brackets 53 and 54 affixed to posts 55 and 56, respectively, on the table. To maintain the liquid contents of the tank at a uniform level, the glue is preferably supplied thereto by the vertical discharge pipe 57 of a sealed glue reservoir 58 of the automatically controlled feed type. The pipe 57, which depends into the tank, is provided with an exteriorly threaded adjusting sleeve 59 which is fitted in a similarly threaded orifice in a plate 60 supported by a suitably located bracket 61. A collar 590 fixed to the pipe 57 rests upon the sleeve 59, and therefore by proper manipulation of the sleeve the pipe can be vertically adjusted in spaced relation to the bottom of the tank in order to effect and ensure any desired level of the glue within the tank. See Figs. 1 and 2. As shown, the bracket 61 is fastened to one end of an upstanding open frame structure 62 which is supported on and is included in the machine frame.

Supported by the post 56 on the table 32 and by a bar 63 depending from a lateral projection 64 on the longitudinally extending channel bar of the frame, is a plate 65 which is formed and arranged not only to overhang one end of the tank 51 but also the path of each succeeding box borne adjacent the tank by the conveyer. In this plate are two spaced apertures 66 and 67, which respectively overlie the tank and the adjacent box. (See Figs. 5, 6, 8 and 18.) Each of these apertures is of sufficient area to permit the free passage therethrough of a depending brush 68 when the latter is positioned above and in alignment with either aperture, as will presently appear.

As shown, the head of the brush 68 is fast on the lower end of a vertical spindle 69 slidably mounted in bearings in an oscillatory carriage 70, said brush thus having capacity for independent vertical reciprocation as well as horizontal oscillation, as will be hereinafter explained.

Figure 5:
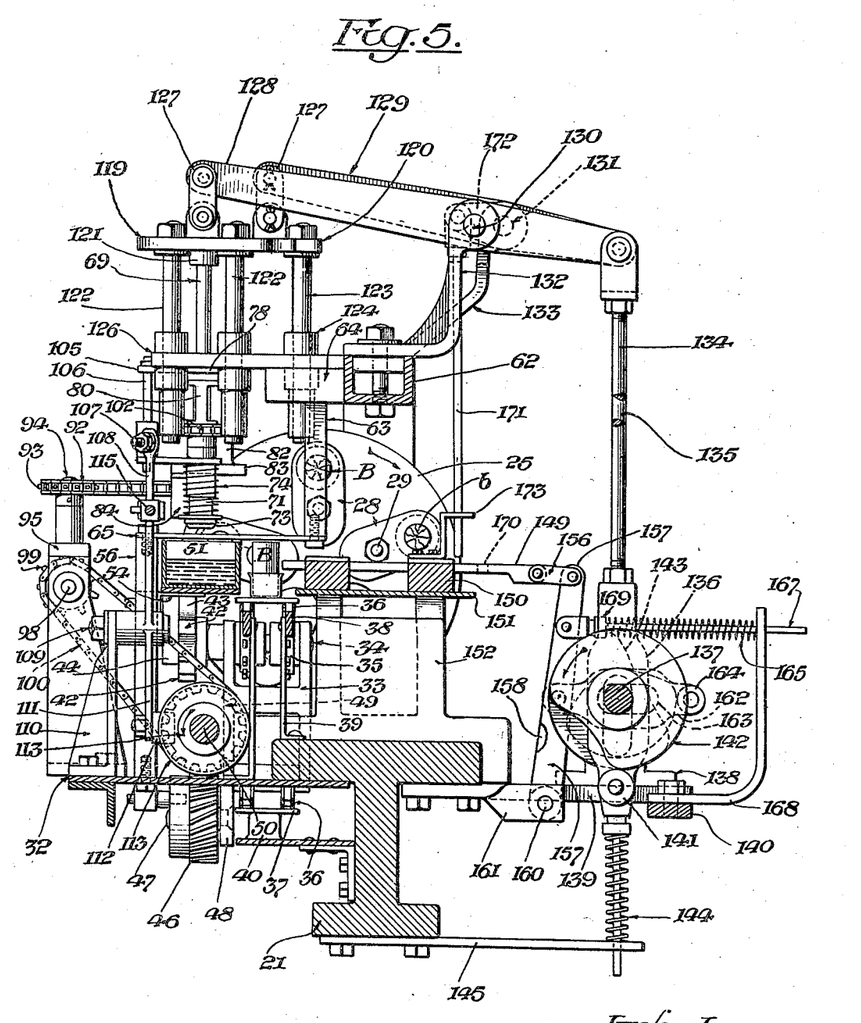
Fig. 5 is a transverse vertical section in a plane through the liquid tank, adjacent said carriage, as on the line 5—5 of Fig. 2, showing the brush spindle in raised position and the brush above the tank.
Figures 6, 7:
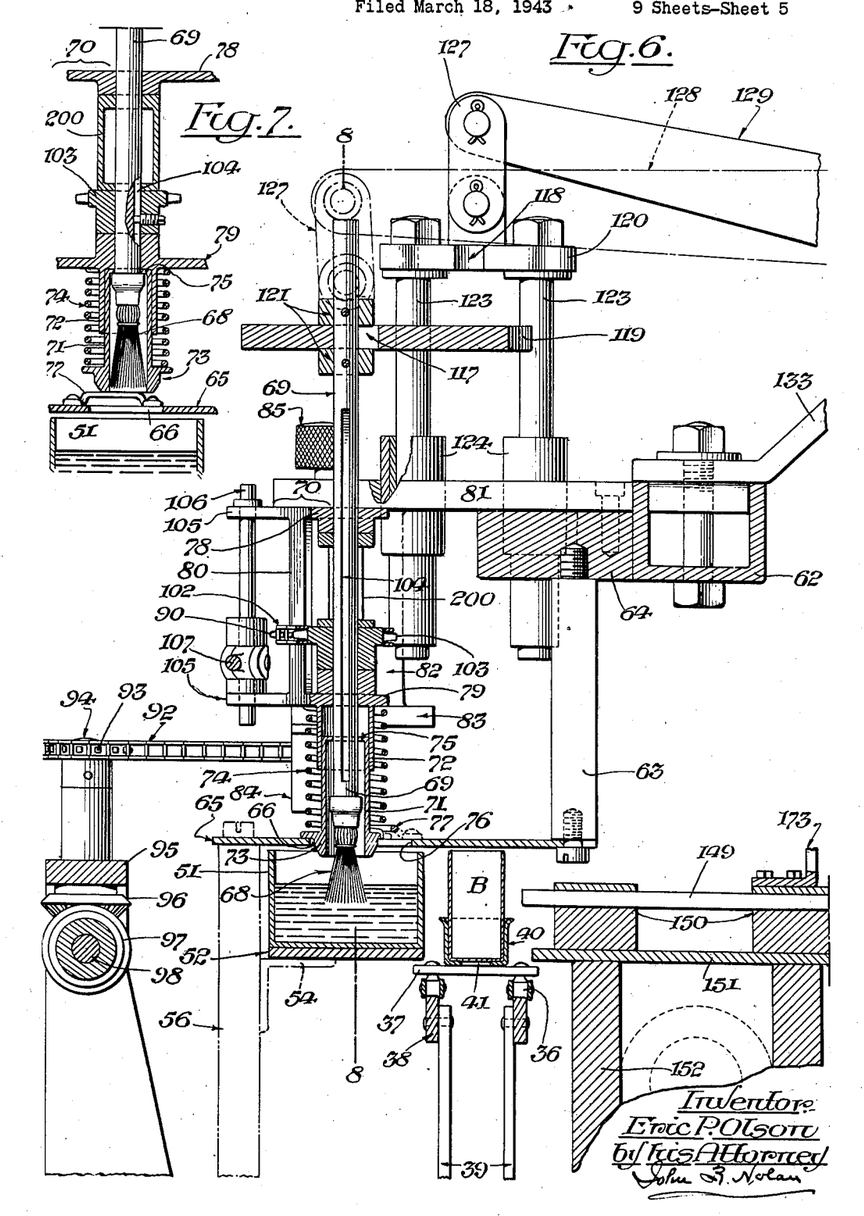
Fig. 6 is a transverse vertical section in a plane through the tank, the brush spindle mounting of the carriage and the laterally adjacent portion of the box conveyer, as on the line 6—6 of Fig. 2, showing the spindle in its down position with the brush dipped in the contents of the tank.
Fig. 7 is a sectional detail of the lower portion of the brush spindle, and adjuncts, showing the spindle raised and the brush above the tank, preparatory to the axial movement of the spindle and its brush over and in alignment with a box on the conveyer.
Figure 8:
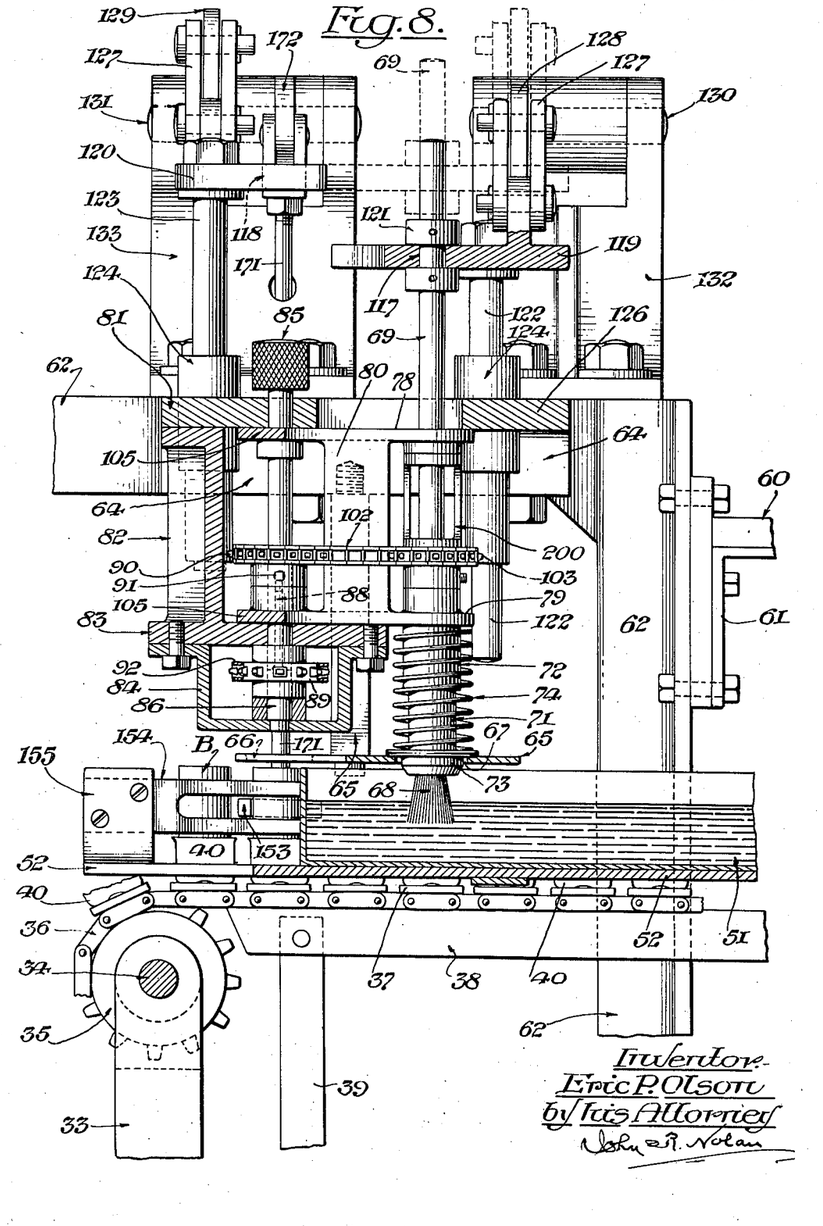
Fig. 8 is a longitudinal vertical section, as on the line 8—8 of Fig. 6.

Loosely fitted on the lower end of the brush spindle and directly above the brush head is the centrally perforated top of a sleeve 71 which is slidably fitted in and guided by a socket member 72 depending from the bottom of the carriage. The sleeve has a frustro-conical foot 73 between which and the bottom of the carriage is interposed a compression spring 74 that urges the sleeve normally toward the plate 65 overhanging the glue tank; the construction being such that when the spindle is in its elevated position, as seen in Figs. 2, 5 and 7, the foot of the sleeve is slightly above the level of the plate 65, and the body of the sleeve surrounds the brush bristles. In the initial descent of the spindle the foot 73 of the sleeve yieldingly abuts the opposing edge of the underlying aperture (66 or 67) of the plate 65, and, in consequence, in the continued downward stroke of the spindle the movement of the sleeve is arrested while the brush bristles pass through and below the aperture in opposition to the action of the spring. When the brush passes through the aperture 66 the bristles dip into the liquid contents of the tank, as seen in Figs. 6 and 8, then in the succeeding upward stroke of the spindle the brush is lifted through and above the cover plate 65, the sleeve thus surrounding the bristles in a manner to compact their expanded free ends and squeeze therefrom excess liquid. As the spindle approaches the limit of its upward stroke the brush head abuts the opposing top 75 of the sleeve, thereby raising the sleeve above the plate 65 and against the pressure of the spring.

Figures 12, 16, 17, 18, 19, 20:
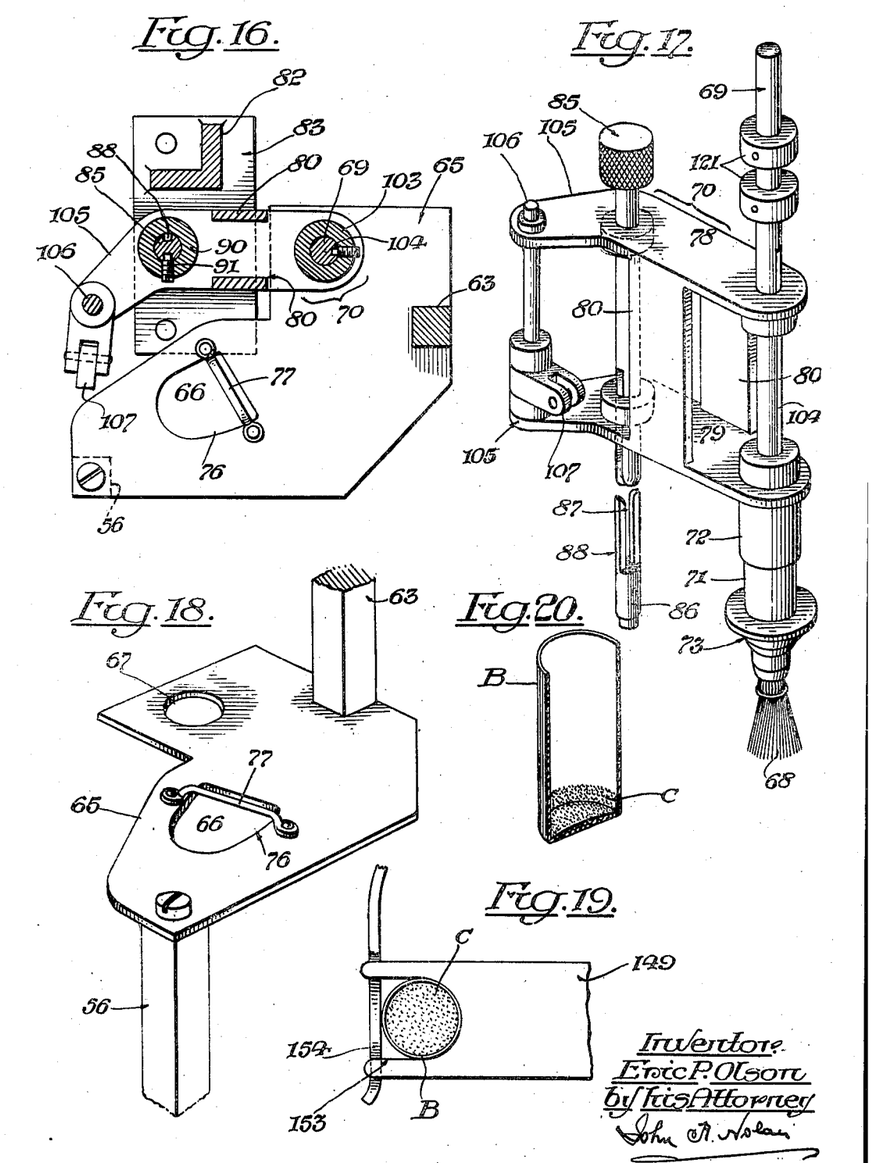
Fig. 16 is a horizontal section through the oscillatory carriage, as on the line 16—16 of Fig. 9, showing the underlying apertured cover plate and that aperture thereof which overlies the liquid tank as provided with a wiper member.
Fig. 17 is a perspective view of the oscillatory carriage, showing the pintle therefor and also the brush and a part of its spindle, the separable extension of the pintle being shown as detached.
Fig. 18 is a similar view of the apertured cover plate.
Fig. 19 is a plan of the bifurcated acting portion of the bolt for centering and holding each succeeding box on the conveyer.
Fig. 20 is a sectional view, in perspective, of a box showing its bottom and the adjacent wall surface as provided with an impermeable coating.

The aperture 66 is elongated, as at 76, and a horizontal wiper rod 77 is mounted on the plate 65 to bridge the elongation close to the path of oscillation of the lower edge of the sleeve foot in its stroke toward the aperture 67 over the tubular box on the conveyer. (See Figs. 4, 7, 16 and 18.) Hence the wiper clears from the sleeve foot any liquid clinging thereto, which liquid drops through the underlying aperture into the tank before the brush is positioned over a box to be internally coated. The depending brush bristles, thus charged, freely enter the box and expand as they progress to and bear upon the bottom of the latter, and since the brush spindle is continuously rotating, as will be hereinafter described, a protective coating is efficiently painted upon and throughout the interior surface of the bottom of the box and also the adjacent portion of the surface of the wall, including any projecting capillary fibres on such surfaces. A section of a box thus coated, as indicated at C, is shown in Fig. 20.

The carriage in which the brush spindle is mounted comprises top and bottom members 78 and 79, respectively, and side members 80. This carriage is mounted for horizontal oscillation in a stationary supporting structure embodying a horizontal plate 81 whereof one end is bolted to the lateral projection 64 of the frame structure 62, while the opposite end of the plate has secured thereto a depending bracket 82 having an angular foot portion 83 which supports an underlying bearing housing 84. (See Figs. 3, 6, 8 and 9.) In the present instance the carriage is pivoted at one end to the supporting structure by means of a detachable pintle 85 which depends freely through perforations in the top and bottom members 78 and 79 of the carriage, and also through perforations in the stationary plate 81 and the foot portion 83 of the bracket 82, the lower end of the pintle having a detachable extension 86 which is stepped in the housing 84, thus permitting rotation of the pintle as well as independent oscillation of the carriage. As shown the lower end of the body of the pintle is longitudinally grooved in its opposite sides, as at 87, and the extension 86 is flattened and longitudinally bifurcated to provide key portions 88 which are slidably fitted in the respective grooves. (See Figs. 9 and 17.) A sprocket wheel 89 fast on the pintle extension is seated within the housing 84, and a similar wheel 90 is secured to the grooved body of the pintle adjacent the upper surface of the bottom of the carriage by means of a set screw 91 or the like which is threaded in the hub of the wheel 90 and the point of the screw entered between the top of a groove 87 and the top of the underlying key portion 88. (See Fig. 16.) Hence the pintle can be readily applied to or removed from the carriage and its supporting structure in order to facilitate the assembly or disassembly of the carriage and its appurtenances, as occasion may require.

The sprocket wheel 89 on the pintle extension 86 is connected by a chain 92 with a similar wheel 93 fast on the upper projecting end of a vertical shaft 94 having its bearing in the top of a housing 95 mounted on the table 32. Fast on the lower end of the shaft 94 is a bevel gear 96 in mesh with a similar gear 97 fast on a short shaft 98 having its bearings in the vertical walls of the housing 95. Also fast on the shaft 98 is a sprocket wheel 99 which is connected by a chain 100 with a similar wheel 101 on the extension 50 of the main driving shaft 22. Thus continuous rotary motion is transmitted from the driving shaft to the pintle 85. (See Figs. 1, 2 and 3, and 4 to 9, inclusive.)

The sprocket wheel 90 on the body of the pintle is connected by a chain 102 with a similar wheel 103 having a slidable spline connection 104 with the brush spindle, a spacer 200 being interposed between the latter wheel and the top of the carriage (Figs. 6, 7, 9 and 17), thereby continuously rotating the spindle and the brush yet permitting their free vertical reciprocation, and this without affecting the oscillatory or swinging motion of the carriage and its appurtenances, as will now be described, reference being had to Figs. 1, 2, 3, 4 and 5.

The top and bottom members of the carriage are provided at the pivoted end of the structure with angular extensions 105 constituting crank arms by actuation of which the carriage together with the brush spindle is bodily oscillated in a horizontal arc to position the depending brush alternately over the apertures 66 and 67 of the cover plate 65, as previously mentioned. The crank arms 105 are perforated to receive the respective ends of a vertical shaft 106 which is pivotally connected by a horizontal link 107 to the upper arm 108 of an upstanding lever which is fulcrumed, as at 109, on a standard 110 rising from the table 32. The lower arm 111 of the lever is equipped with a roll 112 which is held in operative contact with an adjacent cam 113 by the action of a compression spring 114. This spring encircles a rod 115 whereof one end is pivotally connected at the upper arm 108 of the lever, the other end of the rod being slidably supported in the post 55 previously referred to. The spring 114 is interposed between the post and a collar 116 on the rod 115, and the cam is fast on the extension 50 of the main shaft 22 of the bottom finishing machine, the contour of the cam being such that at proper intervals of time when the brush spindle is elevated, the lever 108, 111 is actuated to effect through the connections just described the periodical oscillation of the carriage 70 and its appurtenances.

The upper end of the brush spindle swings freely in a divided arcuate slot of which the respective parts 117 and 118 are formed in two juxtaposed plates 119 and 120, each of which plates has capacity for independent vertical reciprocation. At the limit of their upward strokes the plates are in the same horizontal plane and are so related that the lower end of the swinging brush spindle traverses the space between the two apertures 66 and 67 of the cover plate 65, the upper end of the spindle thus moving from one plate to the other and back again. Spaced set screw collars 121 on the upper end of the brush spindle freely embrace the plate (117 or 118) with which it is associated, thus affording between the spindle and the plate a slidable coupling whereby the spindle partakes of the vertical up and down motions of the proximate plate.

Figures 11, 12, 13, 14, 15:
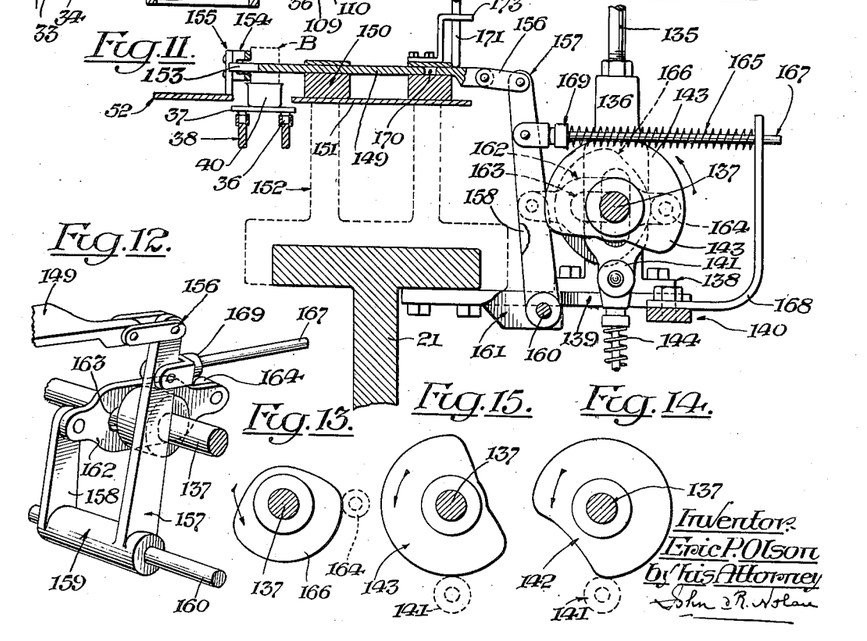
Fig. 11 is a sectional elevation as on the line 11—11 of Fig. 10, showing means including a reciprocating bolt for centering and holding each succeeding box on the conveyer during the coating of the box, said bolt being shown in its idle position in relation to the conveyer in the absence of an opposing box on the conveyer.
Fig. 12 is a detail, in perspective, of lever and link connections for said bolt.
Fig. 13 represents the cam for actuating said bolt connections.
Figs. 14 and 15 represent cams for lowering the brush into the liquid tank and into the box, respectively.

The plates 119 and 120 are secured to and independently supported by pairs of depending rods 122 and 123, respectively, which rods are guided in extended vertical bearings 124 located on the bar 91 and on a spaced bar 126 similarly supported on the lateral projection 64 of the frame structure 62. The companion plates 119 and 120 are pivotally connected by links 127 with the longer arms of two levers 128 and 129, respectively, which levers are fulcrumed on shafts 130 and 131 mounted in bearing brackets 132 and 133 bolted to the longitudinally extending channel bar of the frame structure 62. The shorter arms of the levers are pivotally connected to depending rods 134 and 135, respectively, each of which rods has at its lower end a slotted or yoke portion 136 that slidably embraces a driven shaft 137 extending longitudinally of the machine and having its bearings 138 supported by the spaced rearwardly extending limbs 139 of a skeleton framework 140 which is bolted to the machine frame 21. The yoke portions 136 are equipped with rolls 141 which are maintained in operative contact with cams 142 and 143, respectively, on the driven shaft 137 by means of springs 144 which bear against collars fast on the lower ends of the respective rods 134 and 135 and against stationary bars 145 projecting rearwardly from the machine frame. The shaft 137 is equipped with a sprocket wheel 146 which is operatively connected by means of a chain 147 with a similar wheel 148 on the main shaft extension 50. See Figs. 1 to 6, inclusive. Normally the plates 119 and 120 and their guide rods 122 and 123 are urged to their down position by the force of the springs 144 the relative contours of the cams 142 and 143 (separately shown in Figs. 14 and 15) being such that at proper intervals of time during the operation of the bottom finishing machine the plates and their guide rods are raised by the lever connections and permitted to descend.

From the foregoing it will be seen that when the carriage is at each limit of its oscillatory stroke, with the rotating brush 68 directly over one of the apertures 66 or 67 of the cover plate 65, the brush spindle 69 is vertically reciprocated, thus lowering the brush bristles into and raising them from the liquid contents of the tank 51, or lowering the charged bristles into and raising them from the interior of the underlying tubular box borne by the chain conveyer; the timing of the mechanism being such that during each step of the conveyer the brush is dipped into and raised from the coating liquid, and that during the next succeeding dwell of the conveyer the brush is lowered into and raised from the interior of the underlying box.

Figure 10:
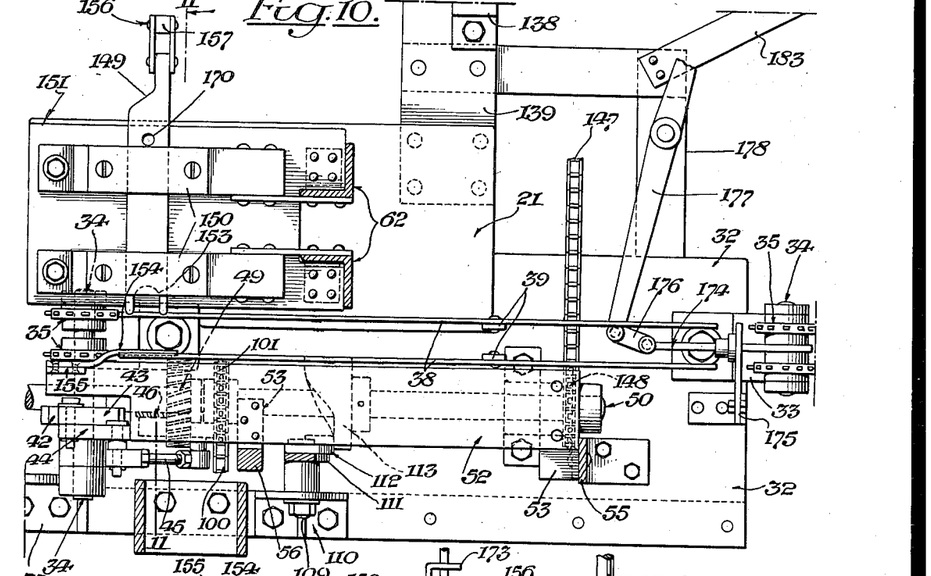
Fig. 10 is a longitudinal horizontal section in a plane directly beneath the upper run of the box conveyer, as on the line 10—10 of Fig. 2.

In order to center and hold against rotation each succeeding box borne by the conveyer when the box is positioned in the path of and is being internally painted by the brush, and also to arrest the descent of the brush in the possible absence of a box thereunder, suitable brake means comprising, in the present instance a bolt 149 reciprocative in a path transversely of the conveyer, is provided. (See Figs. 1, 2, 10 and 19.) The bolt is slidably mounted in guide members 150 on a plate 151 which, in the present instance, is supported by the usual adjustable head 152 which carries the complementary female die (not shown) of the bottom finishing machine, and also by the adjacent legs of the frame structure 62. (See Figs. 1, 5 and 10.) The forward end of the bolt is bifurcated, as at 153, to straddle an opposing box in its supporting cup on the conveyer, when the bolt is pushed forward; thereby clamping the box against a suitable backer member, centering the box and holding it securely in place. In the present instance this backer member comprises a longitudinally bifurcated plate 154 whereof the closed end is supported by an upstanding lip 155 on one end of the shelf 52 upon which the liquid tank 51 is mounted, the plate 154 being suitably arranged to permit the head of the bolt to pass idly therethrough in the absence of a box in its path. The bolt 149 is pivotally connected, as at 156, to the longer of two spaced upstanding lever arms 157 and 158, which rise from a sleeve 159 fast on a rock shaft 160 having its bearings in suitably located brackets 161 supported by the machine frame 21. Pivoted to the shorter lever arm 158 is one end of an actuating arm 162 which, being slotted, as at 163, slidably embraces the driven shaft 137 previously referred to. The outer end of the arm 162 is equipped with a lateral roll 164 which is resiliently held by the action of a suitably arranged spring 165 in operative contact with a cam 166 fast on the driven shaft. In the present instance the spring encircles a rearwardly extending rod 167 one end of which is pivotally connected to the lever arm 157, while the opposite end is slidably fitted in the upstanding member of an angle bracket 168 fastened to the skeleton frame 140, the respective ends of the spring 165 bearing against the opposing bracket member and a collar 169 on the rod. (See Fig. 11.) The contour of the cam 166 (which is separately shown in Fig. 13) is such that in each dwell of the conveyer the bolt 149 is reciprocated toward and from the conveyer.

Formed in the brake bar 149, intermediate its ends, is an orifice 170 which, when the bar is in engagement with a box borne by the conveyer preparatory to the descent of the brush into the box, is in vertical alignment with the lower end of a depending feeler rod 171 whereof the upper end is pivoted to a crank arm 172 projecting from the hub of the lever 129 that carries the slotted plate 120 and the brush spindle. Thus, during the rocking motion of the lever 129 the feeler rod 171 is vertically reciprocated, being guided at its upper end in a perforation in the adjacent bracket 133 and at its lower end by a suitably supported perforated bracket 173. Hence, if in the downward stroke of the rod 171 the forward movement of the bolt should impinge a box on the conveyer, the feeler rod will pass idly through the aligning orifice 170 of the bolt, and therefore the brush will descend into the box, whereas if at any time a box should be absent, the forward end of the bolt will pass idly over the empty cup 40 and in consequence an imperforate portion of the bolt will be positioned under the rod, thus temporarily arresting the descent of the rod 171 until the bolt head meets a succeeding box on the conveyer. (See Figs. 5, 9, 11 and 19.) That is to say, when, in the absence of a box from a holder 40 of the conveyer, the elevated brush is positioned over the empty holder and is at rest, the next succeeding descent of the feeler rod is checked, thus holding up the plate 120 to which the spindle of the brush is coupled. Meanwhile the cams 142 and 143 complete their rotation and at the proper interval the companion plate 119 is moved to the upper level and the slotted portions of the respective plates 119 and 120 are in register. Thereupon the carriage is swung over the aperture 67 above the tank, and the brush is reciprocated into and from the tank, following which the carriage is swung to position the brush over a succeeding holder of the conveyer. If a box be absent from that holder then the descent of the brush will be arrested as before, and so on the descent of the brush will interrupted until a box presents itself to the brush.

The boxes internally coated at their bottoms and adjacent wall surfaces (as indicated in Fig. 20) progress with the upper run of the conveyer to the right hand end of the table 32, as viewed in Figs. 1 and 2. Here the boxes project horizontally beyond and are successively ejected from the holders of the adjacent vertical stretch of the conveyer. The form of ejecting means shown comprises a horizontal plunger 174 which is mounted and arranged to reciprocate in a guide standard 175 rising from the table 32 in the vicinity of the adjacent vertical stretch of the conveyer, the acting end of the plunger being axially aligned with the registering perforations of each succeeding chain spacer 37 and the box holder thereon. The opposite end of the ejecting plunger is pivotally connected by twin links 176 with one arm of a horizontal lever 177 which is fulcrumed on the leg 178 of an angle structure which is secured to the table 32 and the limb 139 of the skeleton framework 140. The other arm of the lever 177 has a roll 179 which is held by the action of the spring 180 in operative contact with a suitable cam 181 fast on the adjacent end of the driven shaft 137. The spring 180 encircles a rod 182 which is pivotally connected at one end to the lever arm bearing the roll 179, and is slidably supported at its opposite end in a bracket 183 extending from the angle leg 178, the spring being interposed between the bracket and a collar 184 fast on the rod. The contour of the cam and the described connections with the ejecting plunger 174 are such that in each dwell of the conveyer the plunger is horizontally reciprocated in a manner to eject the opposing box from the conveyer. (See Figs. 1, 2 and 10.)

It is to be understood that my invention is not limited to the particular exemplifying form or construction herein shown and described, as the same may be modified within the principle of the invention and the scope of the appended claims.

I claim—

1. The combination with a receptacle for coating material, and means for supporting an open-top box adjacent thereto, of a depending brush, means for supporting said brush and alternately positioning it over said receptacle and an adjacent box on said supporting means, and means for independently reciprocating said brush at the limit of each positioning movement thereof, thereby dipping the brush into the contents of the receptacle and transferring the charge to and painting the interior surface of said box.

2. The combination with a receptacle for coating material, and means for supporting an open-top box adjacent thereto, of a depending brush, means for supporting said brush and alternately positioning it over said receptacle and an adjacent box on said supporting means, means for independently rotating said brush, and means for independently reciprocating said brush at the limit of each positioning movement thereof, thereby dipping the rotating brush into the contents of the receptacle and transferring the charge to and painting the interior surface of said box.

3. The combination with a receptacle for coating material, and means for supporting an open-top box adjacent thereto, of a depending brush, means including an oscillatory carriage for supporting said brush and alternately positioning it over said receptacle and an adjacent box on said supporting means, and means for independently reciprocating said brush at the limit of each positioning movement thereof, thereby dipping the brush into the contents of said receptacle and transferring the charge to and painting the interior surface of said box.

4. The combination with a receptacle for coating material, and means for supporting an open-top box adjacent thereto, of a depending brush, means for supporting said brush and alternately positioning it over said receptacle and an adjacent box on said supporting means, and means for independently reciprocating said brush at each limit of its positioning movement, said last-named means including two independently reciprocative members arranged to overhang respectively said receptacle and a box on said box-supporting means, and means for successively coupling said brush to and uncoupling it from the reciprocating members when the brush is at each limit of its positioning movement.

5. The combination with a receptacle for coating material, and means for supporting an open-top box adjacent thereto, of a depending brush, means for supporting said brush and alternately positioning it over said receptacle and an adjacent box on said supporting means, and means for independently reciprocating said brush at the limit of each stroke thereof, said last-named means including two independently reciprocative members arranged to overhang respectively said receptacle and a box on said box-supporting means, and a slidable coupling for said brush and the reciprocative members whereby said brush is successively uncoupled from one member and coupled to the other member when the brush is at each limit of its positioning movement.

6. The combination with a receptacle for coating material, and means for supporting an open-top box adjacent thereto, of a spindle, a depending brush thereon, means for supporting said spindle and its brush and positioning the brush alternately over said receptacle and an adjacent box on the box-supporting means, and means for independently reciprocating said spindle at each limit of its positioning movement, said last-named means including two juxtaposed plates having therein slots which are in communication with each other when the plates are elevated, and which slots freely receive the upper end of the spindle in its horizontal travel, and a slidable coupling arranged on said spindle in cooperative relation to the respective slotted portions of said reciprocating plates.

7. The combination with a receptacle for coating material, and means for supporting an open-top box adjacent thereto, of a depending brush, a spindle therefor, means for supporting said spindle and brush and positioning them alternately over said receptacle and a box on the box-supporting means, means for independently rotating said spindle, means for independently reciprocating the rotating spindle at each limit of its positioning movement, thereby dipping the brush into the contents of the receptacle and transferring the charge to and painting the interior surface of a box on said box-supporting means, a sleeve slidably mounted on said spindle and resiliently urged downwardly and around the brush bristles when the spindle is elevated, and means for arresting the motion of the sleeve in the succeeding descent of the spindle, thus uncovering the bristles.

8. The combination with a receptacle for coating material, and means for supporting an open-top box adjacent thereto, of a depending brush, a spindle therefor, means for supporting said spindle and brush and positioning them alternately over said receptacle and a box on the box-supporting means, means for independently rotating said spindle, means for independently reciprocating the rotating spindle at each limit of its positioning movement, thereby dipping the brush into the contents of the receptacle and transferring the charge to and painting the interior surface of a box on said box-supporting means, a sleeve slidably mounted on said spindle and resiliently urged downwardly and around the brush bristles when the spindle is elevated, and means for arresting the motion of the sleeve in the succeeding descent of the spindle, thus uncovering the bristles, said last-named means including a plate member having spaced orifices therein through which the brush descends while the foot of the sleeve abuts the plate member.

9. The combination with a receptacle for coating material, and means for supporting an open-top box adjacent thereto, of a depending brush, a spindle therefor, means for supporting said spindle and brush and positioning them alternately over said receptacle and a box on the box-supporting means, means for independently rotating said spindle, means for independently reciprocating the rotating spindle longitudinally at each limit of its positioning movement, thereby dipping the brush into the contents of the receptacle and transferring the charge to and painting the interior surface of a box on said box-supporting means, a sleeve slidably mounted on said spindle and resiliently urged downwardly and around the brush bristles when the spindle is elevated, means for arresting the downward motion of the sleeve in each succeeding descent of the spindle, thus uncovering the bristles, and means for removing excess coating material from the foot of the sleeve while the elevated charged brush is initially moving from the receptacle toward the box.

10. The combination with a receptacle for coating material, and means for supporting an open-top box adjacent thereto, of a depending brush, a spindle therefor, means for supporting said spindle and brush and positioning them alternately over said receptacle and a box on the box-supporting means, means for independently rotating said spindle, means for reciprocating the rotating spindle longitudinally at each limit of its positioning movement, thereby dipping the brush into the contents of the receptacle and transferring the charge to painting the interior surface of a box on said box-supporting means, a sleeve slidably mounted on said spindle and resiliently urged downwardly and around the brush bristles when the spindle is elevated, a plate member overlying said receptacle and box-supporting means, said plate member having spaced orifices through which the brush descends at the receptacle and box respectively, while the descent of the sleeve is prevented, and the bristles uncovered by the abutment of the sleeve against said plate member, and a wiper extending across a portion of the orifice over the receptacle so as to scrape excess coating material from the foot of the sleeve while the elevated charged brush is initially moving from the receptacle toward the box.

11. The combination with a receptacle for coating material, a conveyer adjacent thereto having spaced holders for a succession of tubular boxes, and means for intermittently moving said conveyer, of a depending brush, means for supporting said brush and moving it in a horizontal path to position the brush over said receptacle and each succeeding box in alternation, means for rotating said brush, means for reciprocating said brush at the limit of each positioning movement thereof, thereby dipping the brush into the contents of the receptacle and transferring the charge to and painting the interior surface of the box, and brake means for each succeeding box opposed thereto while the rotating brush is entered in said box.

12. The combination with a receptacle for coating material, a conveyer adjacent thereto having spaced holders for a succession of tubular boxes, and means for intermittently moving said conveyer, of a depending brush, means for supporting said brush and moving it in a horizontal path to position the brush over said receptacle and each succeeding box in alternation, means for rotating said brush, means for reciprocating said brush at the limit of each positioning movement thereof, thereby dipping the brush into the contents of the receptacle and transferring the charge to and painting the interior surface of the box, and brake means for each succeeding box opposed thereto while the rotating brush is entered in the box, said last-named means including a movable member having a bifurcated end which is movable in a path across and from each succeeding box holder in the absence of a box therein, but which bifurcated end in the presence of an opposing box straddles the box.

13. The combination with a receptacle for coating material, a conveyer adjacent thereto having spaced holders for a succession of tubular boxes, and means for intermittently moving said conveyer, of a depending brush, means for supporting said brush and moving it in a horizontal path to position the brush over said receptacle and each succeeding box in alternation, means for rotating said brush, means for reciprocating said brush at the limit of each positioning movement thereof, thereby dipping the brush into the contents of the receptacle and transferring the charge to and painting the interior surface of the box, and means for maintaining said brush in elevated position in the absence of a box in the underlying holder.

14. The combination with a receptacle for coating material, a conveyer adjacent thereto having spaced holders for a succession of tubular boxes, and means for intermittently moving said conveyer, of a depending brush, means for supporting said brush and moving it in a horizontal path to position the brush over said receptacle and each succeeding box in alternation, means for rotating said brush, means for reciprocating said brush at the limit of each positioning movement thereof, thereby dipping the brush into the contents of the receptacle and transferring the charge to and painting the interior surface of the box, brake means for each succeeding box opposed thereto while the rotating brush is entered in said box, and means for maintaining said brush in elevated position in the absence of a box in the underlying holder, said last-named means including an element under the influence of said brake means.

15. The combination with a receptacle for coating material, a conveyer adjacent thereto having spaced holders for a succession of tubular boxes, and means for intermittently moving said conveyer, of a depending brush, means for supporting said brush and moving it in a horizontal path to position the brush over said receptacle and each succeeding box in alternation, means for rotating said brush, means for reciprocating said brush at the limit of each positioning movement thereof, thereby dipping the brush into the contents of the receptacle and transferring the charge to and painting the interior surface of the box, means including a movable brake member for preventing rotation of each succeeding box opposed thereto on the conveyer during the painting of the box, and means for maintaining said brush in elevated position in the absence of a box in the underlying holder, said last-named means including a feeler member mounted to reciprocate across the path of the brake member and operatively connected with the means for reciprocating the brush, said brake member constructed and arranged to permit the descent of the feeler member when the brake member is engaged with a box but to obstruct the path of descent of the feeler member in the absence of a box.

ERIC P. OLSON.